United States Patent [19]

Hayek

[11] Patent Number: 4,780,814

[45] Date of Patent: Oct. 25, 1988

[54] GLOBAL SERIAL CHANNEL FOR MICROCONTROLLER

[75] Inventor: George Hayek, Chandler, Ariz.

[73] Assignee: Intel Corporation, Santa Clara, Calif.

[21] Appl. No.: 12,195

[22] Filed: Feb. 9, 1987

[51] Int. Cl.[4] .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,325,119 | 4/1982 | Grandmaison et al. | 364/200 |
| 4,405,979 | 9/1983 | Holtey et al. | 364/200 |
| 4,484,263 | 11/1984 | Olson et al. | 364/200 |

Primary Examiner—Eddie P. Chan
Attorney, Agent, or Firm—Blakely, Sokoloff, Taylor & Zafman

[57] ABSTRACT

The present invention is directed to an onboard multi-protocol communications controller global serial channel ("GSC"). The GSC as disclosed and claimed herein is for use with an 8-bit microcontroller for intelligent communications with peripheral systems or components. The microcontroller and GSC are implemented on a single integrated circuit chip. The microcontroller is a derivative of the 8051 series of microcontrollers sold by INTEL Corporation. The invented GSC interface supports synchronous data link control (SDLC), carrier-sense multi-access with collision detection (CSMA/CD), and user definable (non-standard) protocols. The flexibility in defining non-standard protocols provides the ability to retrofit new products into older serial technologies, as well as the development of proprietary interconnect schemes for serial backplane environments. The GSC operates in full duplex or half-duplex mode and performs cyclic redundancy checking (CRC) for 16 or 32 bits. Data encoding is in Manchester, NRZI or NRZ formats. The GSC may be accessed directly by the processor of the microcontroller or through a direct memory access (DMA) channel.

4 Claims, 3 Drawing Sheets

GLOBAL SERIAL CHANNEL FOR MICROCONTROLLER

SUMMARY OF THE INVENTION

The present invention is directed to an onboard multi-protocol communications controller referred to herein as a global serial channel ("GSC"). The GSC as disclosed and claimed herein is for use with an 8-bit microcontroller for intelligent communications with peripheral systems or components. The microcontroller and GSC are implemented on a single integrated circuit chip. The microcontroller is a derivative of the 8051 series of microcontroller sold by INTEL Corporation. The invention GSC interface supports synchronous data link control (SDLC), carrier-sense multi-access with collision detection (CSMA/CD), and user definable (non-standard) protocols. The flexibility in defining non-standard protocols provides the ability to retrofit new products into older serial technologies, as well as the development of proprietary interconnect schemes for serial backplane environments. The GSC operates in full duplex or half-duplex mode and performs cyclic redundancy checking (CRC) for 16 or 32 bits. Data encoding is in Manchester, NRZI or NRZ formats. The GSC may be accessed directly by the processor of the microcontroller or through a direct memory access (DMA) channel The GSC interface is capable of data rates up to 2 MBaud. In serial backplane applications, the GSC allows other processors or peripheral devices to be easily interconnected. In local area network applications, the data-link layer and physical link layer are implemented in a manner similar to ISO's open system architecture.

The GSC can operate at bit rates from 7.8 KBps to 2 MBps using internal data formatting and clock recovery with a 16 MHz crystal. The baud rate generator allows standard rates to be achieved including the IEEE802.3-LAN standard (1.0 MBps) and the T1 standard (1.544 MBps).

DETAILED DESCRIPTION OF THE INVENTION

In the following description, the terminology employed is consistent with the architecture of the INTEL 8051 microcontroller. Additionally, numerous specific details are set forth, such as specific word or byte length, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. Furthermore, certain details concerning timing considerations and the like have been omitted, inasmuch as such details are not necessary to obtain a complete understanding of the present invention and are within the skills of persons of ordinary skill in the relevant art. Those skilled in the art, who should be familiar with the 8051 architecture and the programming for such microcontroller, will recognize how the various registers and flags which are described herein are accessed.

Figure 1:
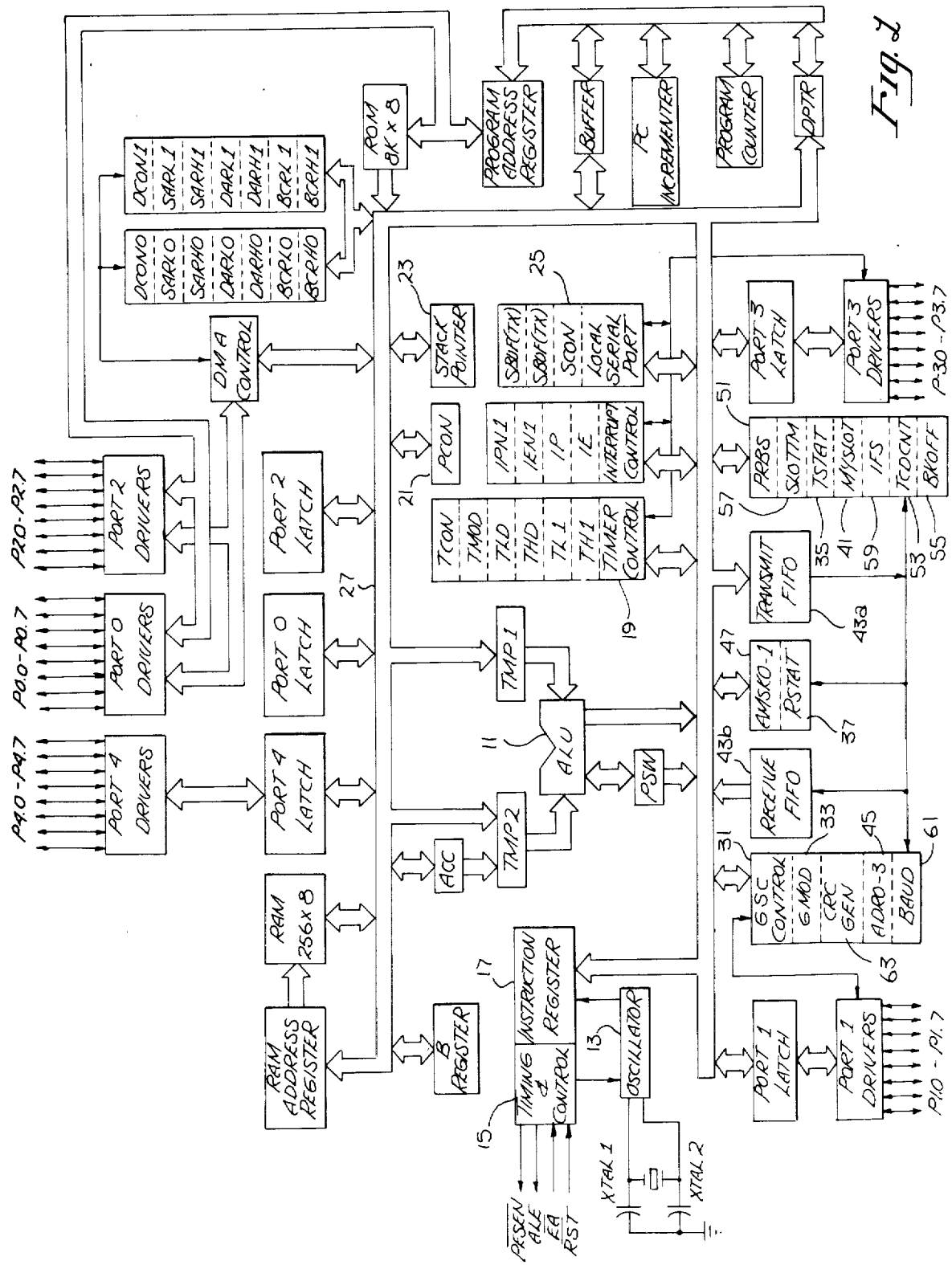
FIG. 1 is an overview block diagram showing the microcontroller in conjunction with which the invented microcontroller has been implemented.

FIG. 1 is a block diagram illustrating the microcontroller in conjunction with which the invented GSC has been implemented. Many of the illustrated components are common to microcontroller architecture in general, and specifically the INTEL 8051 microcontroller. Accordingly, except where necessary for an understanding of the present invention, components such as the arithmetic-logical unit (ALU) 11 and its registers ACC, TMP1, TMP2 and PSW, oscillator 13, timing and control block 15, instruction register 17, timer control 19, power control register (PCON) 21, stack pointer 23, local serial port 25 and the like will not be described herein. All components communicate over the microcontroller internal bus 27.

References in the following descriptions are made to the pins of the microcontroller in conjunction with which the present invention has been implemented. In this connection as an aid to the understanding of the present invention, all the pinouts of the microcontroller are set forth in Table 1.

TABLE 1

| Pin Name | Description |
|---|---|
| VSS | Circuit ground potential. |
| VCC | Supply voltage during normal, idle, and power down operation. |
| XTAL1 | Input to an inverting oscillator amplifier. Also serves as the input for an external clock signal. |
| XTAL2 | Output from an oscillator amplifier. |
| Port 0 | Port 0 is an 8-bit open drain bi-directional I/O port. Port 0 pins that have 1s written to them float and in that state can be used as high-impedance inputs. Port 0 is also a multiplexed low-order address and data bus during accesses to external program and data memory. |
| Port 1 | Port 1 is an 8-bit bi-directional I/O port with internal pullups. Port 1 pins that have 1s written to them are pulled high by the internal pullups, and in that state can be used as inputs. Port 1 also has the following special functions and for the special functions to operate a "1" has to be written to the indicated pin first. |

| Pin | Alternate Function |
|---|---|
| 0 | Global Serial Channel (GSC) receiver data input |
| 1 | GSC transmitter data output |
| 2 | Drive Enable to enable external drivers |
| 3 | GSC external transmit clock input |
| 4 | GSC external receive clock input |
| 5 | DMA hold request |
| 6 | DMA hold acknowledge |
| 7 | none |

| | |
|---|---|
| Port 2 | Port 2 is an 8-bit bi-directional I/O port with internal pullups. Port 2 pins that have 1s written to them are pulled high by the internal pullups, and in that state can be used as inputs. |
| Port 3 | Port 3 is an 8-bit bi-directional I/O port with internal pullups. Port 3 pins that have 1s written to them are pulled high by the internal pullups, and in that state can be used as inputs. Port 3 also has the following special functions and for the special functions to operate the indicated pin must be programmed to a "1" first. |

| Pin | Alternate Function |
|---|---|
| 0 | Local Serial Channel (LSC) data input port |
| 1 | LSC serial data output port |
| 2 | INT0 external interrupt 0 |
| 3 | INT1 external interrupt 1 |
| 4 | T0 Timer 0 external input |
| 5 | T1 Timer 1 external input |
| 6 | WR external data memory write strobe |

TABLE 1-continued

| | | |
|---|---|---|
| | 7 | RD external data memory read strobe |
| Port 4 | | Port 4 is an 8-bit bi-directional I/O port with 40 internal pullups. Port 4 pins that have 1s written to them are pulled high by the internal pullups, and in that state can be used as inputs. |
| RESET | | Reset input. A low level on this pin for two machine cycles while the oscillator is running resets the device. |
| EA | | External Access Enable. EA must be externally held low in order to enable the device to fetch code from external Program Memory locations 0000H to 1FFFH. |
| ALE | | Address Latch Enable output pulse for latching the low byte of the address during accesses to external memory. In normal operation ALE is emitted at a constant rate of 1/6 of the oscillator frequency, and may be used for external timing or clocking purposes. Note, however, that one ALE pulse is skipped during each access to external Data Memory. |
| PSEN | | Program Store Enable is the read strobe to external Program Memory. When the processor is executing code from external Program Memory, PSEN is activated twice each machine cycle, except that two PSEN activations are skipped during each access to external Data Memory. |

GLOBAL SERIAL CHANNEL REGISTERS

The GSC performs as a slave peripheral for the microcontroller processor (CPU) through GSC control block 31. The CPU controls the GSC by accessing the various GSC registers. The GSC registers control selection of operation modes, report status of the GSC and serial link, and initialize parameters used by the GSC. A detailed description of the GSC control registers follows with reference to Table 2. Each of the symbols set forth represents an 8 bit byte. Where applicable, symbols for individual bits i.e., flags within the byte are also set forth under the heading Contents or Flag Identification.

is a sequence of alternating ones and zeroes used for receiver synchronization. The various lengths are shown below. They include the two bit beginning of frame (BOF) flag in CSMA/CD protocol but do not include the SDLC flag. Following the preamble, the BOF is transmitted. In SDLC mode, the BOF is an SDLC flag, otherwise it is two consecutive ones. CSMA/CD mode is not compatible with zero preamble length. The following table summarizes preamble length as a function of the settings of PL1 and PL0.

| Length (bits) | PL1 | PL0 |
|---|---|---|
| 0 | 0 | 0 |
| 8 | 0 | 1 |
| 32 | 1 | 0 |
| 64 | 1 | 1 |

CT: CRC Type—Selects the type of CRC used. If set, 32 bit AUTODIN-II-32 CRC is performed. Otherwise, 16 bit CRC-CCITT is performed.

AL: Address Length—If set, 16 bit addressing is used, otherwise 8 bit addressing is used. In 8 bit mode, if any of the four address registers match the received address, the frame is accepted. Don't care bits in the address match with ADR0 or ADR1 (described below) and may be selected with AMSK0 or AMSK1 (described below), respectively. In 16 bit mode, the received address is compared against the two 16 bit addresses formed by ADR1:ADR0 and ADR3:ADR2 (described below). Don't care bits in the addresa match with ADR1:ADR0 may and be selected with AMSK1:AMSK0. In either 8 or 16 bit mode, frames with a broadcast address of all ones will be received.

M0 and M1: Mode Selects—These two bits enable two special test modes and an optional "alternate backoff" feature. If raw transmit is selected, the transmit output is internally connected to the receiver input. Any data written to the transmit FIFO (TFIFO, as described below) will be transmitted without preamble,

TABLE 2

| Symbol | Contents or Flag Identification | | | | | | | |
|---|---|---|---|---|---|---|---|---|
| GMOD | XTCLK | M1 | M0 | AL | CT | PL1 | PL0 | PR |
| TSTAT | LNI | NOACK | UR | TCDT | TDN | TFNF | TEN | DMA |
| RSTAT | OVR | RCABT | AE | CRCE | RDN | RFNE | GREN | HBAEN |
| MYSLOT | DCJ | DCR | Slot Address (6 bits) | | | | | |
| GBUF | Transmit FIFO | | | | | | | |
| GBUF | Receive FIFO | | | | | | | |
| ADR0 | Address Register 0 | | | | | | | |
| ADR1 | Address Register 1 | | | | | | | |
| ADR2 | Address Register 2 | | | | | | | |
| ADR3 | Address Register 3 | | | | | | | |
| AMSK0 | Address Match Mask 0 | | | | | | | |
| AMSK1 | Address Match Mask 1 | | | | | | | |
| PRBS | Pseudo-Random Binary Sequence | | | | | | | |
| TCDCNT | Transmit Collision Detect Count | | | | | | | |
| BKOFF | Backoff Timer | | | | | | | |
| SLOTTM | Slot Time | | | | | | | |
| IFS | Interframe Spacing | | | | | | | |
| BAUD | Baud Rate | | | | | | | |

GLOBAL CHANNEL MODE REGISTER 33 (GMOD)

PR: Protocol—If set, SDLC protocol with NRZI encoding and SDLC flags are used. If cleared CSMA/CD link access with Manchester encoding is enabled.

PL0 and PL1: Preamble Length—These bits determine the length of the preamble transmitted. The preamble flag or zero bit insertion, and without appending a CRC. The receiver operates as if it were in the normal mode. In this mode, all receiver functions can be tested. If raw receive is selected, external loopback should also be enabled using any unutilized port pin such as port 1, pin 7. The receiver operates as normal except that all bytes following the BOF are loaded into the receive FIFO (RFIFO as described below) including the CRC. The transmitter operates as normal. In this mode, the external transceiver and all transmitter functions can be tested. If alternate backoff mode is selected, the standard Ethernet backoff process will be modified. The backoff will begin at the end of the interframe space interval (IFS). In networks with the IFS time larger than the slot time, a second collision is guaranteed with the Ethernet backoff, since both stations will complete the backoff within the IFS time. The alternate backoff mode prevents this by delaying start of the backoff until the end of the IFS. The following table summarizes mode selection as a function of the settings of M0 and M1.

|  | M1 | M0 |
|---|---|---|
| Normal | 0 | 0 |
| Raw Receive | 0 | 1 |
| Raw Transmit | 1 | 0 |
| Alternate Backoff | 1 | 1 |

XTCLK: External Transmit Clock—If set, an external clock is used for the transmitter (port 1, pin 3). If reset, an internal baud rate generator generates the transmit clock.

TRANSMIT STATUS REGISTER 35 (TSTAT)

DMA: DMA Selected—Indicates to the GSC logic that the DMA channels are being used to service the GSC. Setting this bit causes the GSC interrupts to occur on TDN and RDN, rather than TFNF and RFNE. It also enables UR to become set (TDN, RDN, TFNF, RFNE and UR are described below).

TEN: Transmit Enable—Enables the transmitter. Setting TEN causes the TDN, UR, CDT and NOACK (described below) flags to be reset, and the TFIFO to be cleared. The transmitter will clear TEN after either a successful transmission, or a collision during the data, CRC or end of frame (EOF) flag.

TFNF: Transmit FIFO not full—Indicates that new data may be written to the transmit FIFO. The transmit FIFO is a three byte buffer which loads the transmit shift register with data.

TDN: Transmit done—TDN is set following successful completion of a frame transmission. If HBAEN (described below) is set, TDN will not be set until the end of the interframe space following the transmitted message, so that the acknowledge can be checked. If an acknowledge is expected and not received, TDN is not set. An acknowledge is not expected following a broadcast or multicast packet, and TDN will be set immediately as in non-acknowledge mode.

TCDT: Transmit Collision Detect—Indicates that the transmitter halted due to a collision. This occurs either if a collision occurs during the data or CRC; or if there are more than eight collisions.

UR: Underrun—If set, indicates that in DMA mode the last bit was shifted out of the transmit shift register, the transmit FIFO register was empty, the DMA bit was set and the DMA byte count did not equal zero. If an underrun occurs, the transmitter halts without transmitting the CRC or EOF flag.

NOACK: No acknowledge—Error flag set by transmitter indicating no acknowledge was received on the previous frame. NOACK is set if HBAEN is set and no acknowledge is received prior to the end of the interframe space period. NOACK is not set if a broadcast or multicast packet was transmitted.

LNI: Receive data line is idle. If SDLC protocol is selected, LNI is set if 15 consecutive ones are received following the final EOF flag, or if 8 consecutive ones follow a receiver abort (see description of RCABT flag below). If CSMA/CD protocol is selected, LNI is set if no transitions occur on the GSC receiver data input pin (port 1, pin 1) before the invalid transition window is over. LNI is cleared after a transition on the GSC receiver data input pin.

RECEIVE STATUS REGISTER 37 (RSTAT)

HBAEN: Acknowledge Enable—If set, enables the hardware based acknowledge feature. The "look before talk" mode is not compatible with the hardware based acknowledge feature and should not be enabled.

GREN: Receive Enable—When set, clears the RFIFO and enables the receiver to receive incoming frames by clearing RDN, CRCE, AE, RCABT and OVR (described below). GREN is cleared by the receiver at the end of reception or if any errors occurred.

RFNE: Receive FIFO not empty—If set, indicates that the receive FIFO contains data. The receive FIFO is a three byte buffer into which a receive shift register transfer bytes as they are completed. A CPU read of the GBUF register retrieves the oldest data byte from the RFIFO, and causes the hardware FIFO pointers to be updated.

RDN: Receive done—If set, signals completion of receiver operation. RDN is set at end of frame reception if no CRC, alignment, abort or FIFO overrun errors occurred.

CRCE: CRC error—If set, a properly aligned frame was received with a bad CRC.

AE: Alignment error—When set, if SDLC=0, the line went idle when the receive shift register was not full and the resulting CRC was bad. No error is reported if the CRC is valid. When set, if SDLC=1, a non-byte-aligned flag was received.

RCABT: Receiver Collision/Abort Detect—If CSMA/CD protocol is selected, this bit is set if a collision is detected after data has been loaded into the receive FIFO. If SDLC protocol is selected, this bit indicates that 7 consecutive ones were detected prior to the end flag.

OVR: Overrun—If set, the RFIFO was full and new receive shift register data was written into it.

MY SLOT ADDRESS REGISTER 41 (MYSLOT)

DCJ: D.C. Jam—If set, selects a D.C. type jam of all zeros. Otherwise, A.C. type jam is sent.

DCR: Deterministic Collision Resolution Algorithm—If set, alternate collision resolution algorithm is selected. Retriggering of IFS on reappearance of carrier is also disabled. To use this feature, other registers must also be specially initialized. The alternate backoff mode must also be selected. The TCDCNT register (described below) is used to hold the maximum number of slots. The PRBS register is set to all ones, which disables the PRBS generator (described below). The slot timer value is used as the period of one slot. The backoff timer is used to count down the slots. In the resolution mode, the backoff timer is initially loaded with the TCDCNT value. The timer will decrement once each slot time. When activity is detected on the line, the timer is inhibited and will resume decrementing one interframe space following the line becoming idle. When the backoff timer value equals the station's slot address, the station is allowed to begin transmission. When the backoff timer decrements to zero, normal CSMA/CD access mode is resumed.

Slot: These six bits contain the station's slot address.

Address: Addresses from 1 to 63 may be chosen. A value of zero will prevent a station from transmitting during the collision resolution period by waiting until all the possible slot times have elapsed.

GSC BUFFER REGISTER 43a AND 43b (GBUF)

A write to GBUF puts the data into the transmit FIFO or TFIFO 43a.

Transmission will begin after TEN is set, or immediately if it was already set. A read from GBUF fetches data from the receive FIFO or RFIFO 43b.

ADDRESS MATCH REGISTERS 0 TO 3 45 (ADR0-ADR3)

Contains first, second third and fourth address match values which determines the data which will be accepted as valid.

ADDRESS MATCH MASK 0 AND ADDRESS MATCH MASK 1 47 (AMSK0 AND AMSK1)

Selects don't care bits in the address match with the ADR0 and ADR1 registers, respectively. Any bit can be designated a don't care by writing a one to the corresponding ASMK0 or AMSK1 bit.

PSEUDO-RANDOM BINARY SEQUENCE 51 (PRBS)

Contains a pseudo-random number to be used in the CSMA/CD backoff algorithm. The PRBS generator can be read by the CPU to provide a random seed for use software routines. The number is generated using a feedback shift register clocked by the CPU phase clocks. Writing all ones to PRBS will freeze the value at all ones. Writing any other value will restart the PRBS generator.

TRANSMIT COLLISION DETECT COUNT 53 (TCDCNT)

Contains the number of collisions the current frame has encountered if CSMA/CD is used. If any collisions occurred on the previous transmission, the CPU must clear this register before transmitting a new frame, so that the GSC backoff hardware can distinguish a new frame from a retransmit attempt.

BACKOFF TIMER 55 (BKOFF)

The backoff timer is an 8 bit count-down timer with a clock period equal to one slot time. The backoff timer is used in the CSMA/CD collision resolution algorithm. The CPU may read the timer. The value read may not be completely valid, since the timer counts asynchronously to the CPU clocks. Writing a value to BKOFF has no effect.

SLOT TIME 57 (SLOTTM)

Determines the length of a slot time used in CSMA/CD protocol. The slot time equals $(256 - SLOTTM) \times (bit\ time)$. A bit time is equal to 1/baud rate. A CPU read of SLOTTM accesses the slot time timer. The value read may not be completely valid, since the timer counts asynchronously to the CPU clocks.

INTERFRAME SPACING 59 (IFS)

Determines the number of bit times separating transmitted frames in CSMA/CD protocol. Only even interframe space periods can be used. The number written to this register is divided by two and loaded in the most significant seven bits. Complete interframe space is obtained by counting this seven bit number down to zero twice. A CPU read of IFS accesses the interframe space timer. The top seven bits form the current count value, whereas the least significant bit indicates the interaction number; one for the first count and zero for the second. The value read may not be completely valid, since the timer counts asynchronously to the CPU clocks.

GSC BAUD RATE REGISTER 61 (BAUD)

Contains the value of the programmable baud rate. The baud rate will equal (oscillator frequency)/((BAUD+1)×(8)). A CPU read of BAUD accesses the baud rate generator. The value read may not be completely valid, since the timer counts asynchronously to the CPU clocks.

CRC GENERATOR 63

Figure 2:
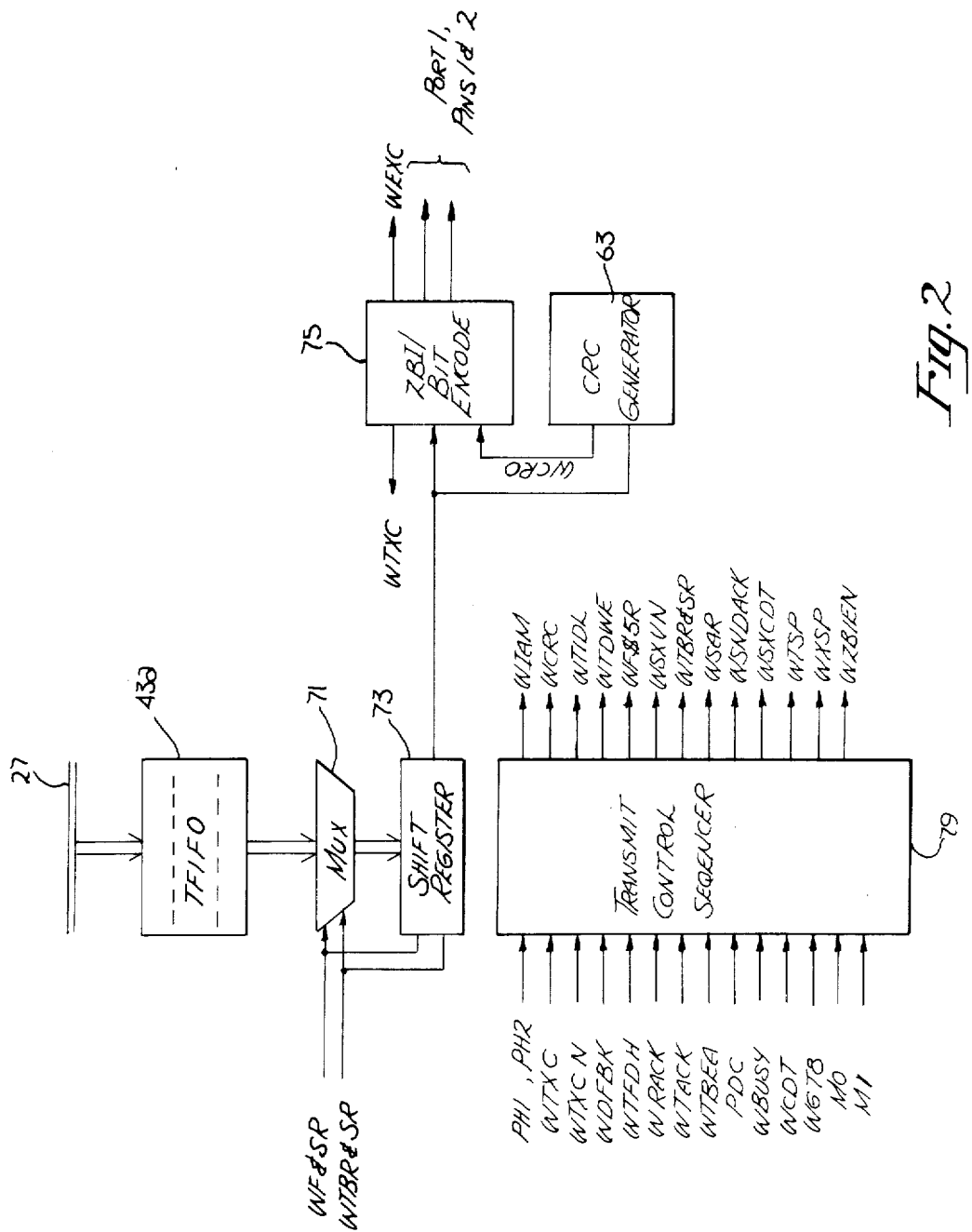
FIG. 2 is a detailed block diagram of GSC control block 31 showing the operation of the transmitter of the GSC.

The cyclic redundancy check (CRC performed by CRC generator 63) is an error checking sequence commonly used in serial communications. The GSC offers two types of CRC Algorithms, a 16 bit and a 32-bit. The 32-bit algorithm is normally used in CSMA/CD applications and conforms to IEEE 802.3. In most SDLC applications, a 16-bit CRC is used and the hardware configuration that supports 16-bit CRC is shown in FIG. 2. The generating polynomial that the CRC generator uses with the 16-bit CRC is:

$$G(X) = X^{16} + X^{12} + X^5 + 1$$

The way the CRC operates is that as a bit is received it is XOR'd with bit 15 of the current CRC and placed in temporary storage. The result of XOR'ing bit 15 with the received bit is then XOR'd with bit 4 and bit 11 as the CRC is shifted one position to the right. The bit in temporary storage is shifted into position 0. The required CRC length for SDLC is 16 bits. The CRC is automatically stripped from the frame and not passed on to the CPU. The last 16 bits are then run through the CRC generator to insure that the correct remainder is left. The remainder that is checked for is 0011101000011111B (1DOF Hex). If there is a mismatch, an error is generated as described below with respect to GSC interrupts. The user software has the option of enabling this interrupt so the CPU is notified.

In addition to the GSC registers described above, proper operation of the GSC requires the use of additional registers in the microcontroller. Specifically the eight bit PCON register 31 contains three bits used by the GSC. A description of each of these bits follows.

Bit 2—GSC Flag Idle Enable (GFIEN)—Setting GFIEN to a 1 causes idle flags to be generated between transmitted frames in SDLC mode. SDLC idle flags consist of 01111110 with each zero shared with the next flag creating the sequence 0111111011111110 . . . 011111110. A possible side effect of enabling GFIEN is that the maximum possible latency from writing to TFIFO until the first bit is transmitted increases from approximately 2 bit-times to approximately 8 bit-times. GFIEN should be cleared when CSMA/CD mode is enabled.

Bit 3—GSC External Receive Clock Enable (XRCLK)—Writing a 1 to XRCLK enables an external clock to be applied to port 1, pin 4. The external clock is used to determine when bits are loaded into the receiver.

Bit 4—GSC Auxiliary Receiver Enable (GAREN). This bit needs to be set to a 1 to enable the reception of back-to-back SDLC frames. A back-to-back SDLC frame is when the EOF and BOF is shared between two sequential frames intended for the same station on the link. If GAREN contains a 0 then the receiver will be disabled upon reception of the EOF and by the time user software re-enables the receiver the first bit(s) may have already passed, in the case of back-to-back frames. Setting GAREN to a 1, prevents the receiver from being disabled by the EOF, but GREN will be cleared and can be checked by user software to determine that an EOF has been received. GAREN has no effect if the GSC is in CSMA/CD mode.

GSC OPERATION

In normal operation the GSC is a half duplex machine. Data for transmission or reception can be transferred by either the CPU or DMA. On power up, the CPU mode is configured. If the DMA is used, it must be configured into serial channel demand mode as explained in co-pending application Ser. No. 015,799 filed Feb. 17, 1987, and the DMA bit in TSTAT should be set. This dictates the choice between two sets of interrupt conditions. If the CPU controls the operation, interrupts are caused on GSC FIFO conditions. For example, if the CPU is transmitting, it will be interrupted if the transmit FIFO is not full. On the other hand in the DMA mode, "transmit/receive done" conditions cause an interrupt to the CPU.

Transmission will begin after the TEN bit is set, and data is written to TFIFO 43a. Data should not be written until after setting TEN, since this also causes the transmit FIFO to be cleared. In CSMA/CD mode, if an attempt to transmit a frame results in a collision following the preamble and BOF flag, the TCDT flag is set, and the transmit hardware completes the jam and backoff. In this case, the CPU must reinitiate a new transmission. If the collision is during the preamble or BOF, the GSC hardware automatically handles the retransmission for up to eight re-attempts. At the end of a valid transmission, the TDN bit is set and TEN is cleared. If hardware based acknowledge (bit HBAEN in RSTAT) is enabled, and the first address bit of the address was zero, then the transmitter waits for an acknowledge from the receiver. TDN is set only if a valid acknowledge is received within one interframe space, otherwise NOACK flag is set. The CPU can enable an interrupt on TDN to determine when a frame is successfully transmitted.

After the receiver is enabled (GREN set), it begins to look for the next valid BOF. After that, the received address bytes are checked against the address registers ADR0-ADR3. If a match occurs the frame will be received. Due to the CRC strip hardware, there is a 40(24) bit time delay following the BOF until the first data byte is loaded into the RFIFO 43b if the 32(16) bit CRC is chosen. If the end of frame (EOF) is detected before data is loaded into RFIFO 43b, the receiver ignores that frame.

For CSMA/CD protocol, if the receiver detects a collision during reception after data was loaded into the RFIFO, the RCABT flag is set. The GSC hardware then halts reception and rests GREN. The CPU is responsible for filtering any collision fragment data which may have been received. If the collision occurs prior to data being put into the RFIFO, the CPU is not notified and the receiver is not disabled. At the end of reception, the RDN bit is set and GREN is cleared. In the hardware based acknowledge (HBA) mode, this causes an acknowledge to be transmitted. The CPU can enable an interrupt on RDN to determine when a frame is completed.

Figure 3:
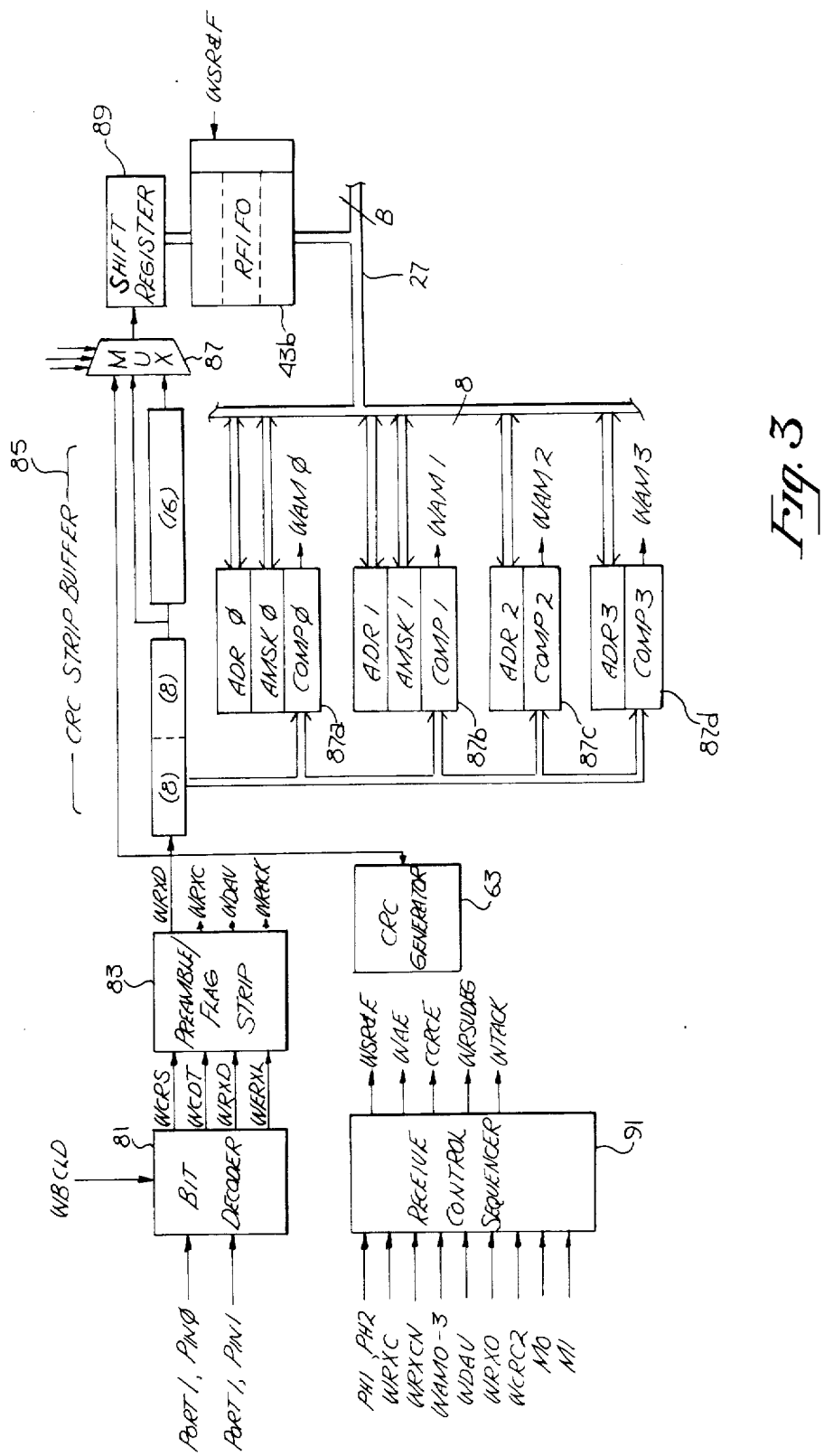
FIG. 3 is a detailed block diagram of GSC control block 31 showing operation of the receiver of the GSC.

Further details of the operation of the GSC channel will now be described with reference to FIGS. 2 and 3 which are detailed block diagrams of the transmitter and receiver respectively of the GSC.

As described above, data to be transmitted is placed on bus 27 and loaded into TFIFO 43a which, as shown in FIG. 2, may be implemented utilizing a three byte FIFO which interfaces with bus 27 on one end and through MUX 71, to a shift register 73 on the other end. MUX 71 selects either the TFIFO 43a output or an SDLC flag as the input to shift register 73 based upon control signal WF$SR which, when asserted, causes the MUX to load the SDLC flag into the shift register and WTBR$SR which instructs the MUX to load TFIFO 43a output into shift register 73. The serial output from shift register 73 is input to ZBI/bit encode block 75 which accepts serial NRZ (binary) data from the shift register or CRC generator 63 and encodes it according to the protocol selected. For CSMA/CD protocol, Manchester encoding is used; for SDLC protocol, NRZI encoding is used. If SDLC is selected, block 75 also performs zero bit insertion as defined by SDLC protocol. The output from block 75 is data and external transceiver enable which go to port 1, pin 1 and port 1, pin 2, respectively. Block 75 also generates the main transmit clock WTXC based upon the input from baud rate generator 61, which input is designated as WEXC in FIG. 2. WTXC is the clock input to shift register 73, TFIFO 43a, CRC generator 63 and transmit control sequencer 79. WTXC is identical to WEXC except in SDLC mode, during a zero bit insertion, WTXC is inhibited for one bit period.

Control sequencer 79 is a state machine which guides the transmitter through different states in order to transmit a complete SDLC or CSMA/CD frame. The control sequencer also includes bit and byte counters to demarcate intra-frame boundaries, keep track of collisions, and jam the line when needed. The inputs to transmit control sequencer 79 are control and status input signals as follows:

PH1, PH2: Main CPU clocks.
WTXC, WTXCN: GSC transmit clocks.
, WDFBK: Defer or backoff signal from the IFS and SLOTTM timer blocks.
WTFDH: First bit of the FIFO output.
WRACK: Acknowledge properly received by the receiver in HBA mode. (Output from preamble/flag strip block 83.)
WTACK: Transmit acknowledge signal that causes acknowledge to be returned in HBA mode.
WTBEA: Transmit FIFO contains data.
PDC: Reset signal from the CPU.
WBUSY: Serial link busy indication.

WCDT: Collision detected.

WGT8: Greater than 8 collisions detected, output from TCDCNT block.

mode bits: Value of the mode control bits M0 and M1 relevant to the transmitter operation from GMOD register.

Based upon such inputs, transmit control sequencer 79 generates all major control signals for the transmitter, which control signals are as follows:

WJAM: Causes bit encoder 75 to jam the line.

WCRC: Causes bit encoder 75 to select the incoming CRC bits from CRC generator 63 to be encoded and transmitted.

WTIDL: Causes bit encoder 75 to transmit the idle condition.

WTDNE: Causes bit encoder 75 to transmit a 1.

WF$SR: Loads shift register 73 with a SDLC flag.

WSDN: Sets the TDN bit in TSTAT.

WTBR$SR: Loads shift register 73 with a byte from TFIFO 43a.

WSUR: Sets the UR bit in TSTAT.

WSNDACK: Sets the NDACK bit in TSTAT.

WSXCDT: Sets the TCD/ABORT bit in TSTAT.

WTPRE: Causes bit encoder 75 to transmit the preamble

WXSP: Controls presetting of the CRC generator.

WZBIEN: Enables zero bit insertion by bit encoder 75.

The transmit control sequencer may be implemented as a set of current-state clocked D-type flip flops together with random logic to evaluate next-state values from the flip flops and generate control signals based upon the current-state and status input signals. A modulo 8 counter is included to distinguish byte boundaries for loading shift register 73. The states maintained within sequencer 79 are idle; preamble; opening flag; and data.

GSC control 31 also comprises a receiver, the details of which will now be described with reference to FIG. 3.

Bit decoder 81 performs a complement of the transmitter bit encoder 75. Decoder 81 receives data from the input pin, i.e. port 1, pin 0, and decodes the proper NRZ (binary) value based upon the protocol chosen as described above with reference to ZBI/bit encode block 75. It also generates clocking information WERXC for the receiver based upon the data signal transitions from either baud rate generator 61 (signal WBCLD) or an I/O pin.

Preamble/flag strip block 83 accepts raw data from bit decoder 81 and strips off either the CSMA/CD preamble or the SDLC flag depending upon the protocol chosen. This block also deletes inserted zeroes as defined by the SDLC protocol.

Preamble/flag strip block 83 generates the data signal WRXD which is the received data decoded in NRZ format; WCRS which indicates detected carrier in CSMA/CD mode; and WCDT which indicates that a collision has been detected in CSMA/CD mode. Additionally, preamble/flag strip block 83 generates control signals WRXC based upon the input WERXC which is a clock generated by baud rate generator 61. Clock WRXC is identical to clock WERXC except in SDLC mode, during a zero bit deletion, WRXC is inhibited for one bit period.

The output WRXD is input to CRC strip buffer 85 which has a 32 bit shift register used to delete the incoming CRC bytes before they are placed into RFIFO 43b. The parallel output from the first 8 bits of the strip buffer are used as the input to the address match comparators COMP0 87a, COMP1 87b and COMP2 87c which generate comparator output signals WAM0-WAM3, respectively based upon the contents of ADR0-ADR3. Of course, as noted above, with respect to address match registers ADR0 and ADR1, address match mask 0 and address match mask 1 (AMSK0 and AMSK1) can be loaded with don't care bits.

Data directly from preamble/flag strip block 83 raw receive mode), data delayed by 16 bit periods and data delayed by 32 bit periods are input to MUX 87 which, based upon the settings of CT, M0 and M1 in GMOD 33, selects one of the three inputs for input to read shift register 89 based upon the length of the CRC chosen. It should be noted that the data directly from preamble/flag strip block 83 is in raw receive mode, i.e., with no CRC performed. The selected output is converted to parallel form by shift register 89 which loads the received data byte into RFIFO 43b, which like TFIFO 43a is a three byte FIFO, the output of which is placed onto bus 27 based upon the signal WSR$F generated by receive control sequencer 91.

Receive control sequencer 91 is a state machine which guides the receiver through different states in order to receive a complete SDLC or CSMA/CD frame, determines whether to accept a frame and determines what status bits to set in RSTAT at the end of a frame. The inputs to receive control sequencer 91 are as follows:

PH1, PH2: Main CPU clocks.

WRXC, WRXCN: GSC Receive clocks.

WAM0-WAM3: Address match comparator outputs. These are checked at the appropriate times after the start of a frame based on the values in the bit and word counters.

WDAV: Data valid signal. The rising edge of WDAV defines the start of valid data on WRXD and the falling edge defines the end of valid data.

WRXD: Decoded receive data.

WCRCZ: Receive CRC valid.

mode bits: Value of the mode control bits M0 and M1 relevant to the receiver operation from GMOD register.

Based upon such inputs, receive control sequencer 91 generates all major control signals for the receiver which control signals are as follows:

WSR$F: Read shift register 89 to RFIFO transfer.

WAE: Alignment error.

WCRCE: CRC error.

WRSUDEG: Update receiver status signal, which causes the bits of the RSTAT register to be updated. Generated on the falling edge of WDAV.

WTACK: Signal that causes the transmitter to send an acknowledge in HBA mode after receipt of a good frame.

Receive control sequencer 91 may be implemented as a set of current-state clocked D-type flip flops together with random logic to evaluate next-state values for the flip flops and generate control signals based on the current-state and status input signals. A modulo 8 counter is included to distinguish byte boundaries for loading RFIFO 43b. A modulo 4 counter, clocked by the overflow of the modulo 8 counter is included to determine when to evaluate the address comparator outputs and when the CRC strip buffer fills up, at which time shift register to RFIFO transfers are enabled. The states maintained within sequencer 91 that are used to determine whether to accept a frame and what status bits in RSTAT to set at the end of the frame are first byte matched with AMAT0 or AMAT2 contents; all is received; address match occurred; data entered into RFIFO; and CRC result of previous byte was valid.

Thus, a multiprotocol communications controller for a single integrated circuit microcontroller has been described. Those skilled in the relevant art will recognize various details provided in this description necessary for a understanding of the invention may be changed without departing from the scope of the invention as defined in the following Claims.

I claim:

1. A multiprotocol communications controller in a single integrated circuit microcontroller, including an address and data bus, said communications controller comprising:
   (a) transmitter buffer means coupled to said bus for accepting data from said bus for serial transmission;
   (b) receiver buffer means coupled to said bus for accepting serial data sent to said controller and placing said data on said bus;
   (c) mode register means coupled to said bus for storing operating modes of the communications controller;
   (d) cyclical redundancy check generator means coupled to said transmit buffer means and said receive buffer buffer for generating cyclical redundancy check bytes;
   (e) baud rate generator means coupled to said bus for setting the baud rate of said communications controller under program control;
   (f) receiver status register means coupled to said bus for storing the status of the receiver buffer means;
   (g) transmit status register means for storing the status of the transmitter buffer means;
   (h) pseudo-random binary sequence generator means coupled to said bus for generating a pseudo-random number;
   (i) slot time generator means coupled to said bus for determining the length of a slot time;
   (j) slot address register means coupled to said bus for selecting station slot addresses;
   (k) interframe spacing means coupled to said bus for determining the number of bit times separating the transmitted frames;
   (l) transmit collision detector counter means coupled to said bus for counting the number of collisions the current frame has encountered; and
   (m) channel control means coupled to said bus for generating control signals for operation of said communications controller.

2. The communications controller defined by claim 1 further comprising address match register means coupled to said bus for containing values which define valid data sent to said controller and address match mask means coupled to said address match register means for selecting don't care bits in said address match register means.

3. The communications controller defined by claim 1 wherein said channel control means comprises transmit control sequencer means coupled to said transmitter buffer means, a shift register means and bit encoder means,
   said shift register means for converting parallel data on said bus to serial data,
   said encoder means for encoding said serial data into a predetermined format,
   said transmit control sequencer means for generating said control signals needed by said communications controller for transmitting said serial data.

4. The communications controller defined by claim 1 wherein said channel control means comprises receive control sequencer means coupled to said receiver buffer, a shift register and bit decoder means,
   said decoder means for decoding received serial data to a predetermined format,
   said shift register means for converting said formatted serial data to parallel data for placing on said bus by said receiver buffer means,
   said receive control sequencer means for generating said control signals needed by said communications controller for receiving said serial data.

* * * * *